E. GUYER.
Vegetable Cutter.

No. 32,247.

Patented May 7, 1861.

Witnesses.

Inventor:
Earl Guyer

UNITED STATES PATENT OFFICE.

EARL GUYER, OF WOLCOTT, VERMONT.

VEGETABLE-CUTTER.

Specification of Letters Patent No. 32,247, dated May 7, 1861.

*To all whom it may concern:*

Be it known that I, EARL GUYER, of Wolcott, in the county of Lamoille and State of Vermont, have invented a new and useful Improvement in Vegetable-Cutters; and I do hereby declare that the following is a full, clear, and exact description of the same, reference being had to the accompanying drawings, forming a part of this specification, in which—

Figure 2:
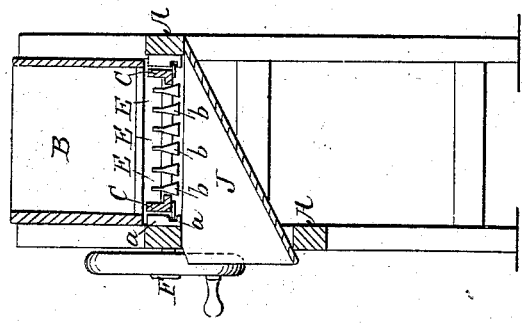
Figure 1:
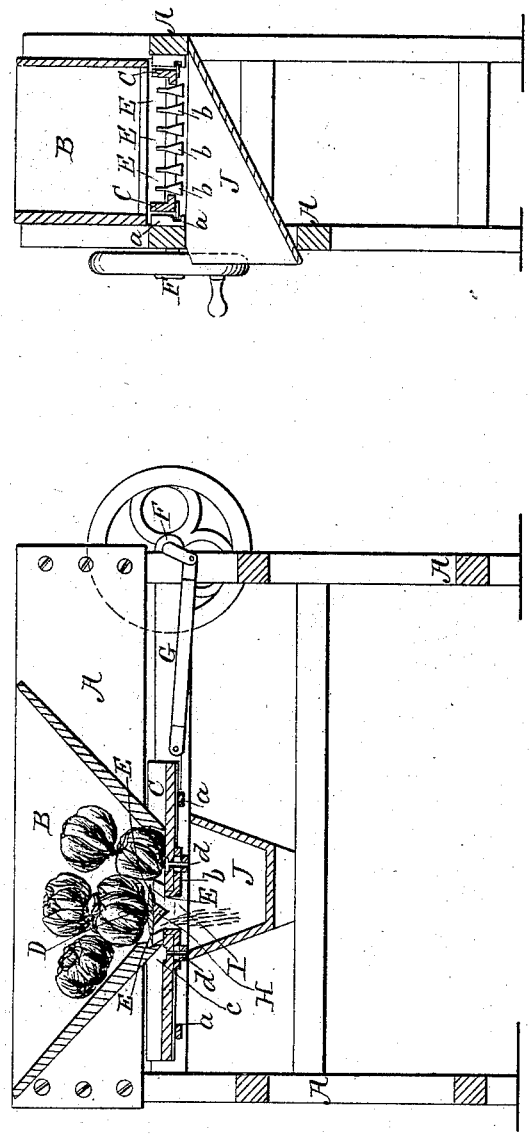
Figure 3:
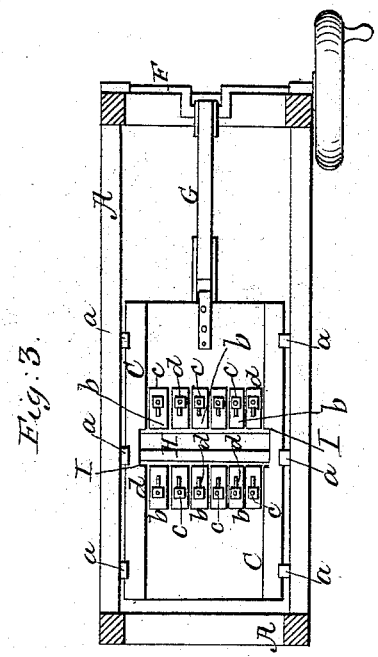

Figure 1 is a vertical longitudinal section of my improved machine. Fig. 2, is a vertical transverse section of the same, and Fig. 3, is a horizontal section, the machine being inverted.

Similar letters of reference in each of the several figures indicate corresponding parts.

To enable others skilled in the art to make and use my invention, I will proceed to describe its construction and operation.

A, is the frame; B, the hopper; C, the reciprocating slide; D, and E, E′, the knives; F, the crank shaft; G, the pitman; H, the device for dividing the discharge passage I, and J, the spout for conducting off the cut substances.

By examining the drawing, it will be seen that a V shaped bar is arranged transversely under the horizontal double edged knife D, so as to act as a partition between the two sets of vertical knives E, E′, and thus prevent the passage of the cut substances from one set of the vertical knives to the other as the slide reciprocates rapidly. It is essential to separate the knives, as there is liability of clogging if the substances cut by the two sets of vertical knives are not immediately arrested and directed into the spout J, by a device similar to the transverse V shaped bar H. It will further be seen that the reciprocating slide is arranged to slide back and forth on narrow separated guide pieces $a, a, a$. And that the horizontal double edged knife D, and the two sets of vertical knives are arranged on the reciprocating slide. The latter being furnished with an under inclining sharp edge and connected to the slide by means of angular slotted extensions $b, b$. The object in giving the sharp edges an inclination is to have them while cutting act to hold down the substances. And the object in connecting the knives by means of slotted angular extensions is to insure a firm hold upon the slide and to admit of their being adjusted as they wear away; the slots admitting clamping screw bolts $c, d$, through them, by loosening the nuts $d$, of which the knives can be separately adjusted, as occasion may require.

My invention greatly improves the vegetable cutter as it prevents choking when the machine is worked at a high speed and also admits of the knives being readily taken out and sharpened or adjusted.

What I claim as my invention and desire to secure by Letters Patent, is—

The dividing bar H, horizontal double edged knife D, in combination with two sets of angular, slotted adjustable knives E, E′, in the manner and for the purpose described.

EARL GUYER.

Witnesses:
GOODWIN Y. AT LEE,
GUSTAVUS DIETERICH.